May 11, 1937.　　A. A. HODGKINS　　2,079,995
ABRASIVE TOOL
Filed Jan. 29, 1934　　2 Sheets-Sheet 1
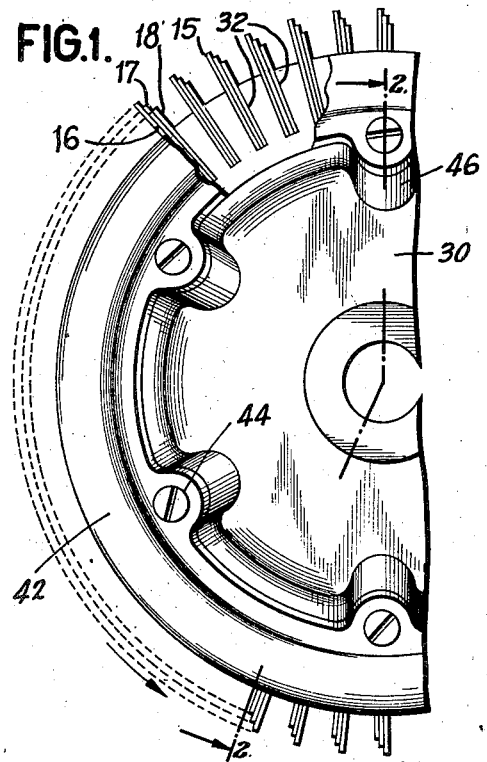
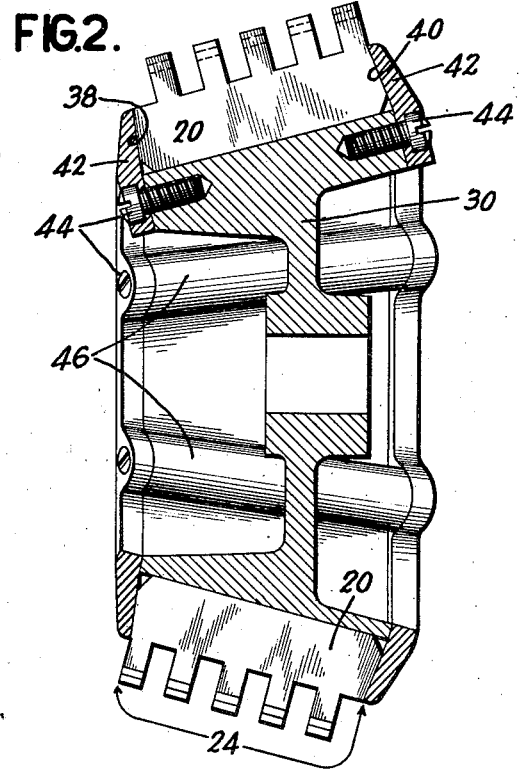
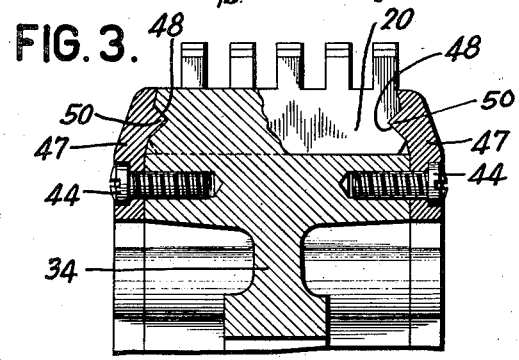
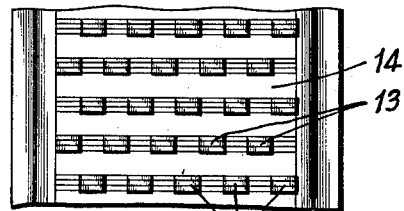
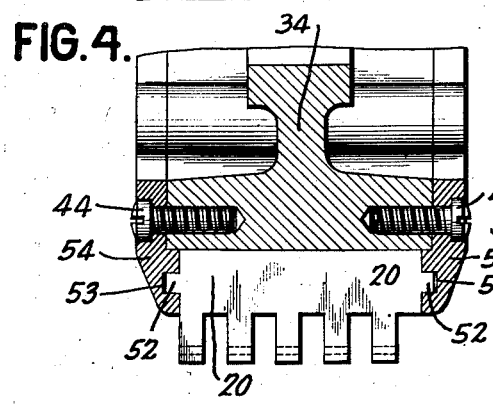
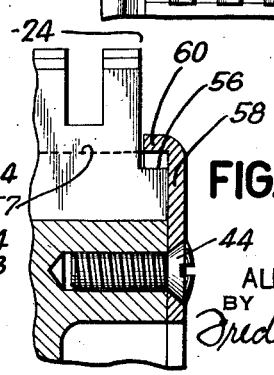
INVENTOR-
ALBERT A. HODGKINS
BY Frederick Griswold
ATTORNEY- May 11, 1937.  A. A. HODGKINS  2,079,995
ABRASIVE TOOL
Filed Jan. 29, 1934  2 Sheets-Sheet 2
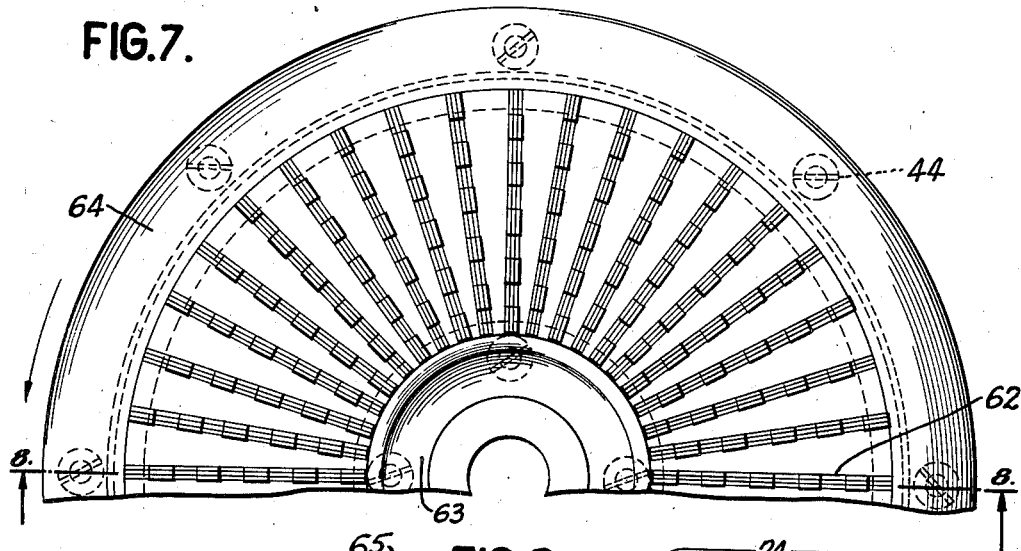
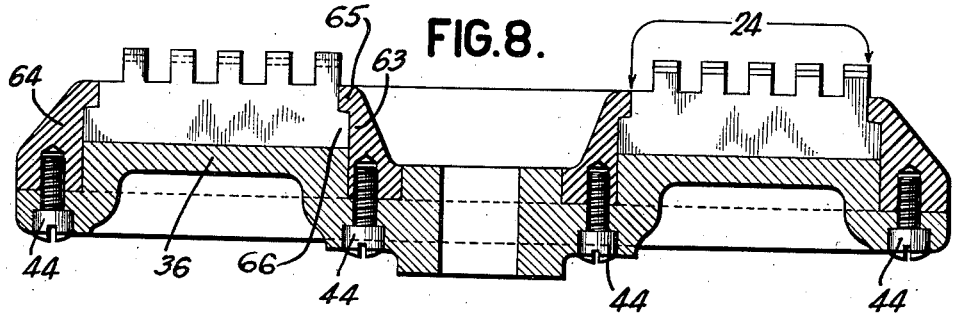
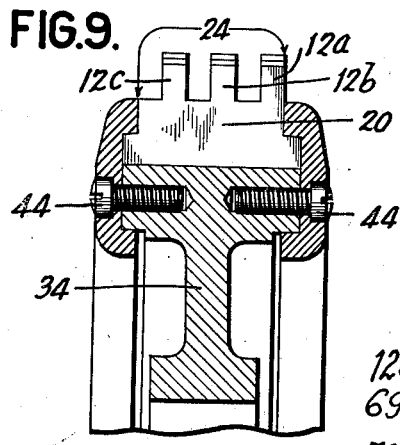
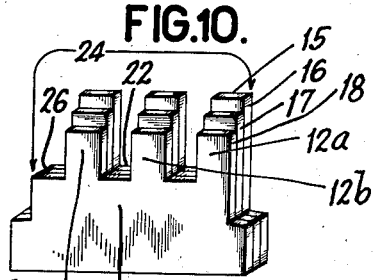
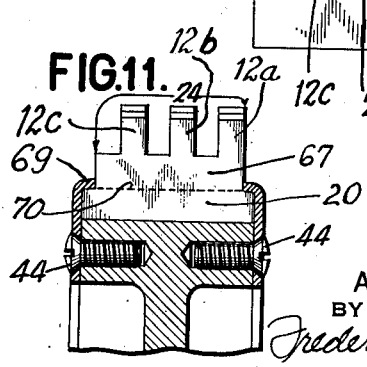
INVENTOR-
ALBERT A. HODGKINS
BY
Frederick Griswold Jr.
ATTORNEY Patented May 11, 1937

2,079,995

UNITED STATES PATENT OFFICE 2,079,995

ABRASIVE TOOL

Albert A. Hodgkins, Leonia, N. J., assignor to Surfacing Wheel Corporation, New York, N. Y., a corporation of Delaware Application January 29, 1934, Serial No. 708,716

2 Claims. (Cl. 29—78)

This invention relates to improvements in rotary abrading, cutting and polishing tools.

It is often desirable that surfaces of materials present a smooth or finished appearance. Articles of manufacture are treated to remove foreign substances, excess material and other undesirable surfaces. Unsightly ridges or fins formed in moulding articles are removed. Similarly, unsightly projections and ridges resulting from the forms employed on cast concrete structures are removed for appearance sake. Many metal articles require the removal of a scale or iron oxide prior to use or finishing. Likewise before protective coatings can be applied, it is necessary, in many cases, to prepare a relatively smooth surface. Resurfacing is also advantageous in some cases before refinishing.

Heretofore, incrustations or other foreign matter have been removed and cast and molded surfaces have been surfaced by wire bristle brushes, grinding wheels, steel burring wheels and the like. Such tools have a relatively short life. The wire bristles spread apart, crystallize and break after relatively few hours. Grinding wheels, when employed on relatively soft material, become clogged with abraded material and require frequent redressing which is costly both as to the time consumed thereby and the shortening of the life of the wheel resulting therefrom. Grinding wheels are also susceptible of bursting during rotation due to centrifugal forces set up therein. Burring wheels have to be used with extreme caution in order to prevent grooving the surface to be refinished. Concrete, for instance, requires the use thereon of abrasive wheels, burring wheels and wire brushes before a smooth surface is attained.

In the removal of the surface or coating which forms on certain grades of steel, a cutting compound is required in order to prevent burning the cutting edge of the tool steel employed in usual machine shop practice.

One object of the present invention is to provide a resurfacing tool which shall be more effective and shall enjoy a longer life than existing devices.

Another object of the invention is to provide a tool that shall both cut or abrade undesirable material and polish the surface in one and the same operation. Accordingly, a rotary tool is provided having a plurality of flexible teeth as the abrading and polishing elements.

The invention also seeks the provision of teeth for devices of the character described which shall not carbonize, crystallize or break in use. To this end, abrading elements, arranged in multiple and comprising laminations of progressively decreasing length, are arranged in stepped relation one behind the other whereby the cutting and polishing teeth have a resilient character and retain their shape and characteristics substantially indefinitely, only the cutting edge wearing down to the limit of its effectiveness.

The invention seeks, further, a device of the character described in which the cutting or polishing elements are interchangeable or replaceable with elements having the same or different abrasive and/or polishing characteristics and thereby providing for the quick and easy removal of the abrasive elements.

Yet another object of the invention is to provide abrasive elements comprised of a plurality of teeth integrally united with a common base or carrying portion in the interest of a celerity of manufacture, assembly and replacement.

A further object of the invention is to provide flexible or resilient teeth, increasing the abrading ability of the teeth and causing the teeth to be self-cleaning.

Still another object of the invention is a device of the character described which will not overheat and will not clog with the material abraded. Accordingly, the teeth are in spaced relationship whereby heat is dissipated readily.

It is also an object of this invention to provide abrasive elements for a tool of the character described which can not become displaced in use although operated at relatively high speeds.

The invention further seeks an abrasive device which is practical from the standpoint of ease and cheapness of manufacture and upkeep, convenience, universality and durability in use.

These and other objects of the invention and the means for their attainment will be more apparent from the following detailed description, taken in connection with the accompanying drawings illustrating various embodiments by which the invention may be realized and in which:

Figure 1 is a view, in front elevation showing one form taken by the device of this invention, parts being broken away to show details of construction;

Figure 2 is a sectional view taken along the line 2—2 of Figure 1; looking in the direction of the arrows;

Figure 3 is a fragmentary sectional view showing another form of the securing means for the teeth;

Figure 4 is a sectional view showing yet another form of the invention;

Figure 5 is a view looking at the abrading surface and showing the arrangement of teeth;

Figure 6 is a fragmentary, partial view, showing a further modification of the teeth holding device of this invention whereby the teeth are radially yielding;

Figure 7 is a front view of a modified form of this invention;

Figure 8 is a sectional view taken on the line 8—8 of Figure 7, looking in the direction of the arrows;

Figure 9 is a fragmentary sectional view of a modified tooth element with its associated clamping means;

Figure 10 is a view in perspective of the tooth element of Figure 9; and

Figure 11 is a fragmentary view of the teeth elements of Figure 9 with modified holding means.

In carrying this invention into effect, see Figure 5, a plurality of radially disposed abrading teeth 12, 13 are distributed in parallel rows in radial planes in spaced relationship over the surface of a hub or wheel 14, rotated by any convenient form of power driven shaft, not shown, and the teeth are brought seriatim into abrasive contact with the work. The teeth are flexible and resilient to a degree and assume a curvature as their cutting edges 15 (Figure 1) come into operative contact with the work on a line contact. To prevent the free or protruding ends of the teeth assuming an angular relationship with that portion of the teeth embedded or clamped in the hub thereby forming a bend on a transverse line at that point which would break on flexure due, presumably, to crystallization of the metal of the teeth, each cutting member 16 is resiliently reenforced or backed up on the side opposite to that first approaching the work by a plurality of resilient laminations 17, 18 progressively shorter rearwardly than the cutting blade 16, that is, the longest blade 16 having the so-called cutting or abrading edge 15 coming into operative contact with the surface of the work to be treated. Thus each tooth is, in the preferred embodiment comprised of three blades 16, 17 and 18, the longest one, 16, of the three being in the direction of rotation of the tool, all as shown, described and claimed in my copending application, Serial No. 652,622 filed January 20, 1933.

To facilitate manufacture and assembly, the cutting or abrading element of this invention, as shown in Figure 10, comprises a plurality of cutting teeth 12a, 12b and 12c, for instance, integral with what may be considered a common base 20 to form a castellated lamination which can be stamped from tool steel or other appropriate material depending on the nature of the object to be abraded. The spaces 22 between the teeth are substantially equal to the width of a tooth and the width of the cutting surface of the tool as a whole indicated by the numeral 24 is wider by the width of one space, as at 26, so that, as shown in Figures 5 and 7, adjacent assemblies may be reversed with respect to each other whereby the teeth of one circumferential row, say, the row of teeth 13, are offset with respect to the teeth 12 and are opposite the spaces 22 of adjacent rows and thus the entire surface of the work is acted upon. Any convenient number of teeth may be disposed in a single row.

The laminated teeth 12 or 13 are rectangular in outline and equal in length. The length and number of the teeth are varied dependent upon the nature of the work. A shorter length tooth on the abrasive lamination 16 is more desirable on hard substances such as oxide scale and the like while the longer teeth blades abrade the softer materials, such as brass and wood, more advantageously. The teeth spacing of each lamination is similar to each adjacent lamination varying only in the length of the teeth portion. The width of the base portion 20 of the laminations 16, 17 and 18 determines the number of teeth projecting.

Were a single blade or leaf 16, as shown in Figure 10, used and tightly clamped in a holder and brought into contact with the work in the usual manner, it would be deflected substantially in a plane and bent along an imaginary line at the base of the projection. This would cause crystallization followed by fracture by the repetition of such deflection arising from normal usage. However, if said blade 16 be yieldingly reenforced so that a gradual change in curvature results during use, the life of the device is materially lengthened. The only limit thereon is the wearing quality of the protruding blade 16. Blade 16 may, therefore, be of better quality or thicker than supporting blades 17, 18 of Figure 10, which yieldingly support blade 16.

The abrasive element shown in Figure 10 is easy to assemble in the hub as a unit and can be removed or replaced more quickly than individual laminated teeth.

In the modification illustrated in Figures 1 and 2, the hub member 30 is of frusto-conical form provided with a plurality of slots 32 lying in radial planes and extending preferably entirely across the face of the wheel 30 to receive the teeth assemblies. In Figures 3, 4, 5, 6, 9 and 11, the slots are formed in the peripheral surface of the hub 34 shown as cylindrical. In the modification of Figures 7 and 8, the teeth are disposed in similar slots formed upon one face of a disc-like wheel 36.

Annular clamping rings are secured to each side of the hub to secure the teeth assemblies tightly in position. The tools are rotated at high speed and to prevent the teeth flying out under the influence of centrifugal force, they are locked in place by cooperating faces, shown in the different figures. Thus in the modification of Figure 2, the ends of the common base portions are progressively greater in length or tapered away from the teeth to form tapered shoulders 38 engaged by cooperating inwardly tapered surfaces 40 of the clamping rings 42 on one side of the abrasive element and a like ring on the other side thereof. Both discs are secured by means of screws 44 to the hub 30. The taper is so arranged that the centrifugal tension set up due to rotation of the device, tends to lock the device together more securely. The heads of the screws 44 conveniently fit into counterbored holes in the clamping means 42. The screw itself may, if desired, be threaded into inner ribs 46 on the hub portion 30. The general shape and design of the hub follows the general flywheel design in which the smallest amount of metal is used without weakening the structure. Figure 2 shows a radial type tool in which the abrading surface forms a frusto-conical design.

In Figures 3 and 4, there is shown a similar radial type tool in which, also, a five-tooth assembly is used as in Figures 1 and 2, but in which the ends of the teeth lie in a cylindrical plane. The abrading element of Figure 3 is formed with notches 48. The clamping means 47 are correspondingly formed with annular keys or ribs 50 received in the notches so that the teeth are firmly held or anchored against the centrifugal action of the wheel.

Figure 4 discloses the same features as Figure 3 except that the parts are reversed, rectangular lugs 52 being formed on the ends of the base portions 20 received in annular grooves 53 formed in the inner faces of the clamping rings 54.

Figure 5 illustrates the alternate arrangement of the adjacent abrasive elements 12 and 13. This is accomplished by reversing the order of assembly of the laminations. These laminations have projections or teeth extending from the body portion in a systematical arrangement one-half the width of a tooth, off center. This arrangement permits a material saving in the original cost of manufacture and in the number of abrasive elements necessary to keep in stock for replacements. For ease of assembly and for handling purposes, the laminations of an abrading element, Figure 10, may be welded, soldered or otherwise secured together.

In Figure 6, there is shown modified clamping means permitting a restricted radial movement of the abrading element 24. This permits longer life of the abrasive element by providing for an additional cushioning or yielding action on the first contact of the teeth with the work. This cushioning is conveniently accomplished by reducing the width of the slotted portion of the hub on each side and forming the base portions of the abrasive elements with the shoulder 56 at each end. The clamping rings 58 may then be formed with inturned flanges 60 normally spaced from the shoulders 56 to permit radial movement for a short distance of the abrasive elements. As the teeth are revolved, they take a position as far from the axis of rotation as they are permitted. On contacting with the work, the teeth give radially, until the base portion of the abrasive element touches the bottom of the slots in the hub. The peripheral surface of the hub is indicated by the dotted line 57.

Referring now to Figures 7 and 8, a cup shaped tool is there shown with the abrading elements positioned in recessed radial slots 62 located on the face of the wheel 36 and secured by appropriate clamping means comprising an inner ring 63 and outer ring 64 secured preferably by screws 44 entering from the other or rear face. In this modification, as well as that of Figure 9, which shows a narrower radial type brush having an abrading element consisting of only three teeth, the clamping rings are formed with inwardly directed shoulders 65 engaging lugs 66 at each end of the base portions.

In some other situations, it may be found desirable to permit a larger amount of the metal of the abrasive element to flex, see Figure 11, and to this end, a part 67 of the base portion 20, as well as the teeth 12a, 12b, 12c projecting therefrom, is not clamped (by the clamping rings 68, for instance). The flange 69 of the clamping means extends only slightly higher than half of the depth of the base of said abrasive element, the slotted periphery of the hub being indicated by the dotted line 70.

Various modifications will occur to those skilled in the art in the configuration, composition and disposition of the component elements retaining the teeth in position as well as in the number and disposition of such teeth and no limitation is intended by the phraseology of the foregoing specification or illustrations in the accompanying drawings.

What is claimed is:—

1. In a rotary tool of the character described, a rotary member provided with a plurality of radially disposed grooves, in combination with a laminated blade seated in each of said grooves, each blade comprising a plurality of flexible laminations, the outer edge of each lamination being castellated to form a plurality of spaced teeth with their working edges in a common line, the corresponding teeth of the several laminations in each blade varying in height and being arranged so that the teeth are progressively shorter in the direction opposite to that of the rotation of the rotary member, and locking means engageable with the ends of the several laminations and with the rotary member, for securing the several blades in operative position in their respective grooves, the ends of the laminations being provided with means for engaging with said locking means.

2. In a rotary tool of the character described, a rotary member provided with a plurality of radially disposed grooves, in combination with a laminated blade seated in each of said grooves, each blade comprising a plurality of flexible laminations, the outer edge of each lamination being castellated to form a plurality of spaced teeth with their working edges in a common line, the corresponding teeth of the several laminations in each blade varying in height and being arranged so that the teeth are progressively shorter in the direction opposite to that of the rotation of the rotary member, the teeth of one blade being arranged in staggered relation with respect to the teeth of an adjoining blade, and annular clamping means carried by the rotary member and engageable with the ends of the several laminations, for securing the several blades in operative position in the respective grooves, the ends of the laminations being provided with means for engagement with said annular clamping means.

ALBERT A. HODGKINS.